United States Patent [19]
Novak

[11] Patent Number: 6,009,633
[45] Date of Patent: Jan. 4, 2000

[54] CALIPER JIG

[76] Inventor: Ronald D. Novak, c/o Novak Enterprises, L.L.C., 1900 Traymore Rd., Minnetonka, Minn. 55305

[21] Appl. No.: 09/036,805

[22] Filed: Mar. 9, 1998

Related U.S. Application Data

[60] Provisional application No. 60/040,238, Mar. 11, 1997.

[51] Int. Cl.[7] .............................. G01B 3/22; B25H 7/02; A47F 1/10
[52] U.S. Cl. ..................... 33/833; 33/567.1; 248/298.1
[58] Field of Search .................................. 33/567.1, 783, 33/792, 795, 803, 810, 812, 833, DIG. 1; 248/298.1

[56] References Cited

U.S. PATENT DOCUMENTS

| | | | |
|---|---|---|---|
| 2,747,291 | 5/1956 | Snyder | 33/567.1 |
| 2,821,022 | 1/1958 | Woodward | 33/567.1 |
| 4,265,021 | 5/1981 | Campbell | 33/833 |
| 4,291,465 | 9/1981 | Hemeyer | 33/833 |

FOREIGN PATENT DOCUMENTS

| | | | |
|---|---|---|---|
| 0569835 | 2/1959 | Canada | 33/567.1 |

*Primary Examiner*—Randy W. Gibson
*Attorney, Agent, or Firm*—Patterson & Keough, P.A.

[57] ABSTRACT

A caliper jig for use with a caliper, the caliper having a fixed measuring blade and an opposed moveable measuring blade, includes a caliper jig body having a first blade engaging device, a second blade engaging device, and a biasing device, the first blade engaging device for selectively, fixedly engaging the caliper fixed measuring blade, the second blade engaging device for selectively, fixedly engaging the caliper moveable measuring blade, the second blade engaging device being translatable with respect to the first blade engaging device, and the biasing device for biasing the second blade engaging device to a disposition displaced from the first blade engaging device.

14 Claims, 4 Drawing Sheets

CALIPER JIG

RELATED APPLICATION

This application claims the benefit of U.S. Provisional Application No. 60/040,238, filed Mar. 11, 1997, and incorporated herein in its entirety by reference.

TECHNICAL FIELD

The present invention is a jig for use with a caliper. More particularly, the jig permits the caliper to be utilized in place of a more expensive dial indicator.

BACKGROUND OF THE INVENTION

Dial indicators are typically used with milling and turning machines in order to measure various parameters of the piece being milled and turned. The dial indicator has a rotary dial for accurately measuring displacement. A moveable, biased probe translates longitudinally and drives the dial responsive to longitudinal motion of the probe. The dial indicator is typically affixed proximate a portion of the milling or turning machine and held in place by an adjustable frame. The probe is brought into contact with a moveable component of the milling or turning machine. Motion of the milling or turning machine with respect to the dial indicator causes longitudinal motion of the probe. Such motion is registered on the dial. The readout of the dial provides a measurement of the translation of the moveable component of the milling or turning machine. In this manner a dimension of a milling or turning operation can be accurately monitored.

A disadvantage of dial indicators is that they are fairly expensive devices, typically starting at about $400.00 apiece. It would be a decided advantage in the industry to have a device that would perform the function of the dial indicator, but cost substantially less.

SUMMARY OF THE INVENTION

The present invention substantially meets the aforementioned need. A caliper, particularly a dial caliper, is virtually universally utilized by machinist operators in the milling and turning trades. Accordingly, such instruments are readily available to the operator of a milling or turning machine. A dial caliper is an accurate measuring instrument, usually utilized to measure inside and outside diameters and the distance between two points on a workpiece. A dial caliper is typically a relatively inexpensive device, starting at approximately $30.00 for a stainless steel model. More expensive models are available, including digital readouts replacing the analog dial. Nonetheless, the more simple models are a very accurate measuring device in the hands of a skilled operator and are entirely adequate for most operations of milling and turning machines.

The caliper jig of the present invention enables the ordinary dial caliper to preform the function of the substantially more expensive dial indicator. The caliper jig itself is a relatively inexpensive accessory to be used with the caliper in performing the dial indication function in conjunction with a milling or turning operation.

In order to perform the aforementioned measuring function, the caliper jig, with the dial caliper in place, is placed proximate the milling or turning machine in a position such that the distal end of the tail piece of the caliper bears upon a movable portion of the milling or turning machine. Translation of the tail piece responsive to linear motion of the movable portion of the milling or turning machine results in motion of the sliding blade of the caliper with respect to the fixed blade of the caliper, thereby provides a measurement of the motion of the milling or turning machine in performing the milling or turning operation. The bias designed into the caliper jig maintains the tail piece of the caliper in contact with the milling or turning machine during bi-directional longitudinal translations in opposed directions. The relatively inexpensive caliper jig of the present invention, in combination with the caliper, is thus able to perform the same function as the more expensive dial indicator.

The caliper jig of the present invention is designed for use with a caliper, the caliper having a fixed measuring blade and an opposed moveable measuring blade. The caliper jig includes a caliper jig body having a first blade engaging means, a second blade engaging means, and a biasing means, the first blade engaging means for selectively, fixedly engaging the caliper fixed measuring blade, the second blade engaging device for selectively, fixedly engaging the caliper moveable measuring blade, the second blade engaging means being translatable with respect to the first blade engaging means, and the biasing means for biasing the second blade engaging means to a disposition displaced from the first blade engaging means.

DETAILED DESCRIPTION OF THE DRAWINGS

Figure 1:
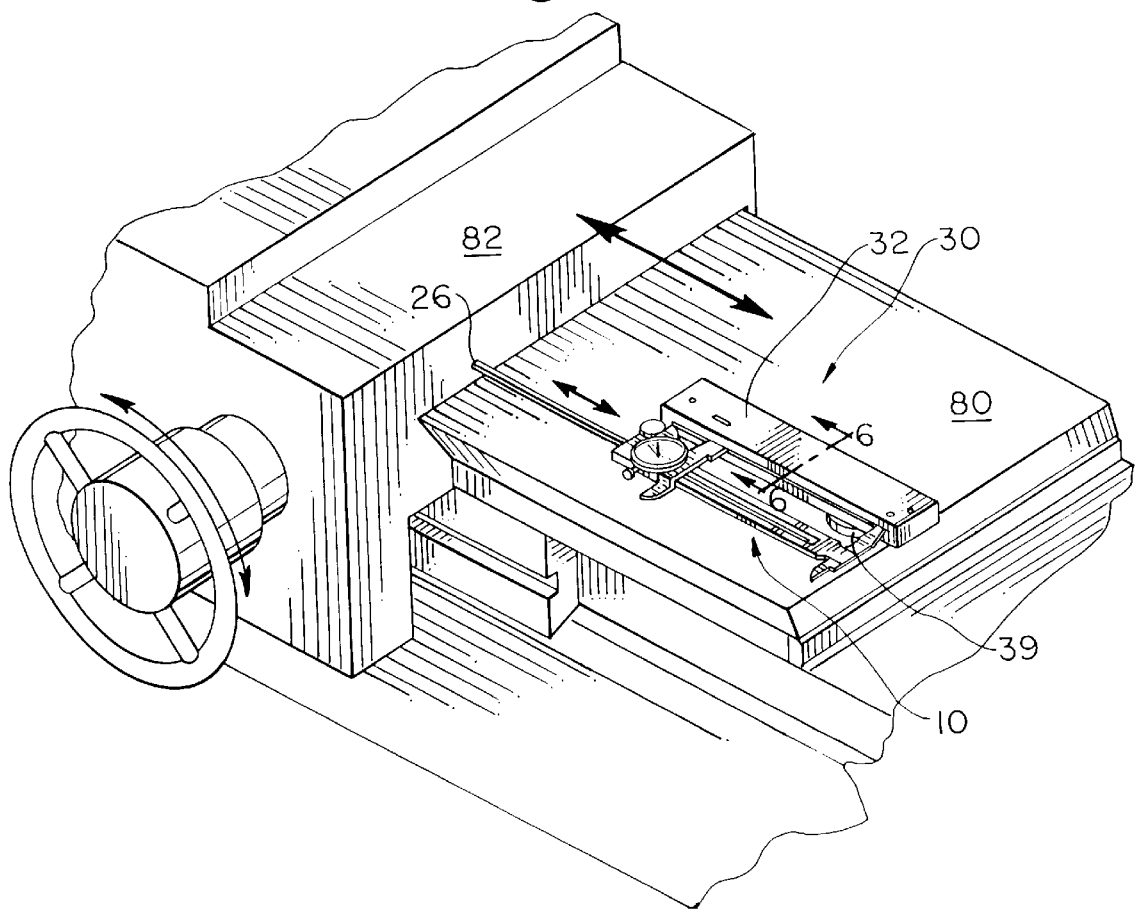
FIG. 1 is a depiction of the caliper jig of the present invention in place relative to components of a milling or turning machine.
Figure 2:
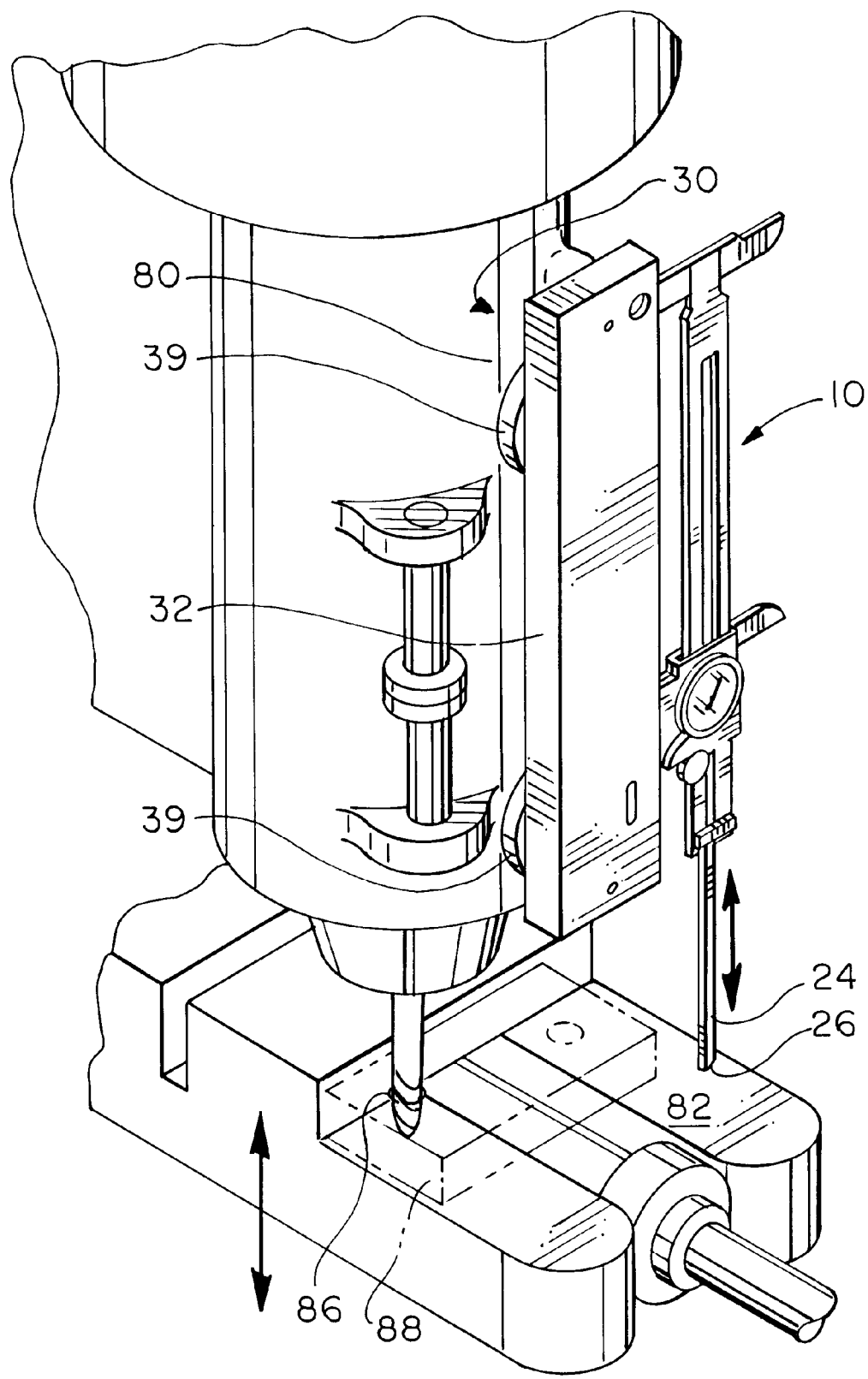
FIG. 2 is a depiction of the caliper jig of the present invention in place relative to components of a drill press machine.
Figure 3:
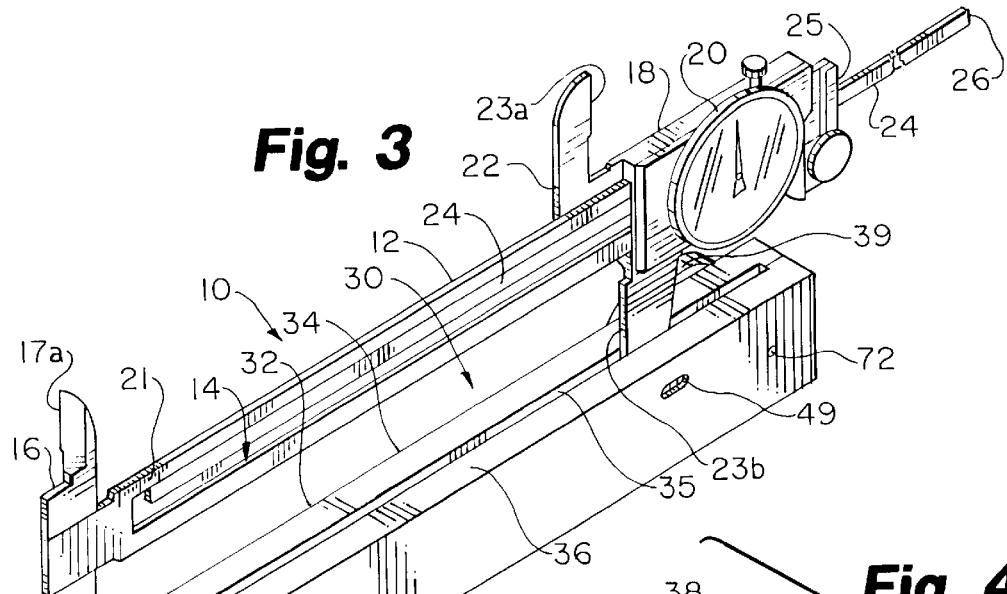
FIG. 3 is a perspective view of the caliper jig of the present invention with a caliper mounted thereon.

A caliper is shown generally at 10 in FIGS. 1–3 and 5. Referring specifically to FIG. 3, the caliper 10 has an elongate graduated body 12. A groove 14 is defined in the center of the graduated body 12. A fixed measuring blade 16 is fixedly coupled to the graduated body 12 at a first end thereof and is disposed substantially transverse thereto. The measuring blade 16 typically has two opposed measuring surfaces 17a, 17b.

A slide 18 is translatably positioned on the graduated body 12. The slide 18 has a dial 20 that rotates responsive to translation of the slide 18 with respect to the graduated body 12. The caliper 10 has gradations 21 inscribed on the body 12. Typically, the gradations 21 are in inches and tenths of inches. The dial 20 is geared to the slide 18 and is typically calibrated in hundredths of an inch. Accordingly, each time the slide 18 translates a tenth of an inch, the dial 20 makes a full revolution. A practiced eye can readily measure to thousands of an inch with the dial 20 by interpolating between the indications on the dial 20.

The slide 18 has a sliding measuring blade 22 disposed substantially transverse thereto that is opposed to the fixed blade 16 for measuring distances between the fixed blade 16 and the sliding blade 22. The measuring blade 22 typically has two opposed measuring surfaces 23a, 23b. In usual use of caliper 10, a work piece to be measured is positioned between the measuring surface 17b of the fixed blade 16 and the measuring surface 23b of the sliding blade 22 and a reading is made off the gradations inscribed on the body 12 and the indications on the dial 20. Alternatively, an inside diameter may be made between the measuring surface 17a of the fixed blade 16 and the measuring surface 23a of the sliding blade 22.

A tail piece 24 is fixedly coupled to the slide 18 and rides within the groove 14. As the distance between the fixed blade 16 and the sliding blade 22 is increased, the tail piece 24 projects an increasing distance from the second end 25 of the graduated body 12. The tail piece 24 has a distal end 26.

Figure 4:
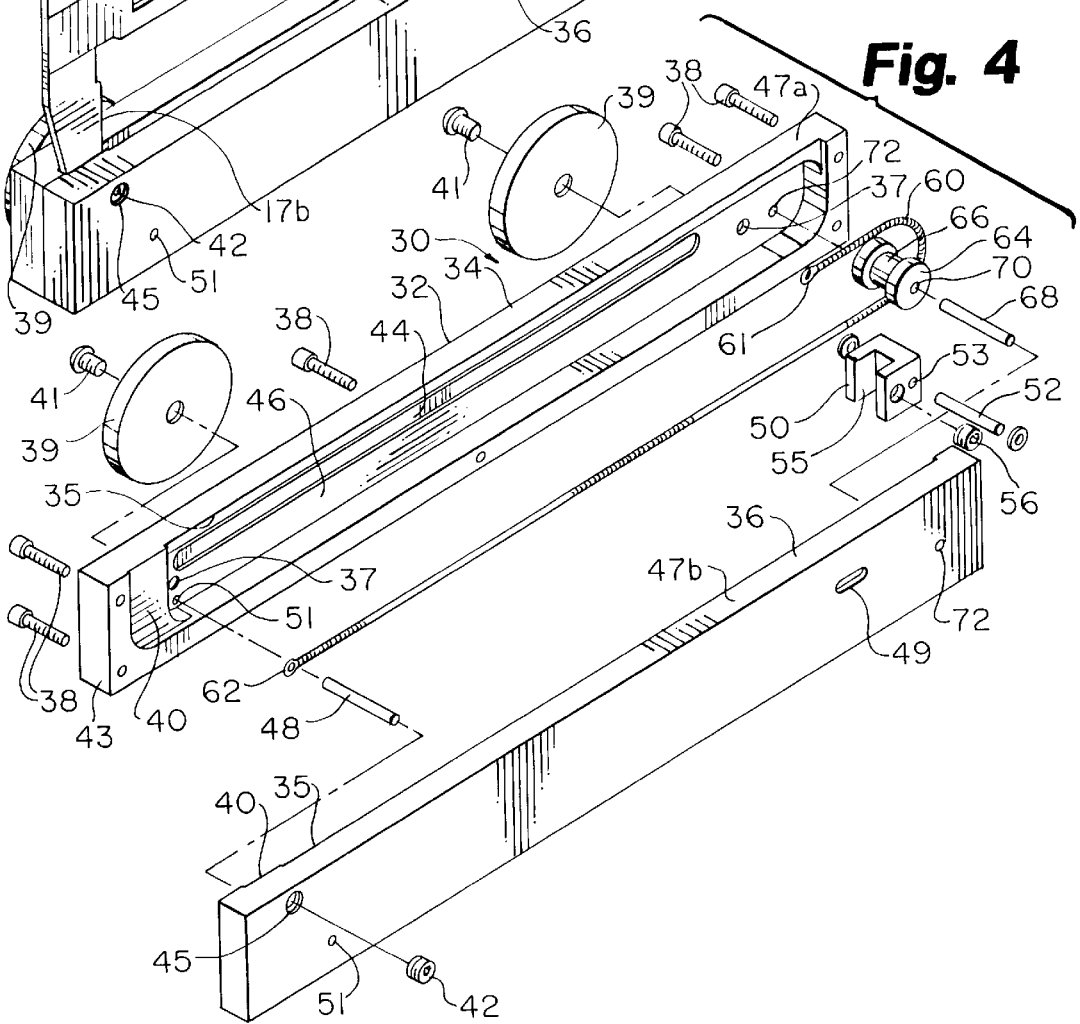
FIG. 4 is an exploded perspective view of the caliper jig of the present invention.

The caliper jig of the present invention is shown generally at 30. The caliper jig 30 has a body 32. The body 32 is preferably formed of body halves 34, 36. The two body halves 34, 36 are fixedly joined by cap screws 38. The cap screws 38 are inserted through bores defined in the body half 34 and into threaded bores (not shown) defined in the inner surface of the body half 36. An elongate central slot 35 is defined in the upper surface of the body 32, as depicted in FIGS. 3 and 4.

A plurality of magnets 39 may be disposed on the outward directed side of the body half 34 of the body 32. The magnets 39 are utilized for temporarily affixing the caliper jig 30 in a desired disposition on a magnetic surface. In a preferred embodiment, there are two spaced apart, generally circular magnets 39. The magnets are affixed to the body half 34 by screws 41 threadedly engaged with threaded bores 37, depicted in FIG. 4. In an alternative embodiment, a plurality of magnets 39 may also be disposed in the underside of the body 32 so that the caliper jig may be disposed in an upright disposition, as depicted in FIGS. 3 and 4, with respect to milling or turning machine.

A fixed blade slot 40 is defined proximate a first end 43 of the caliper jig 30 between the body halves 34, 36. A threaded bore 45 intersects the fixed blade slot 40. A set screw 42 is threaded into the threaded bore 43. The set screw 42 bears upon the fixed blade 16 of the caliper 10 when the caliper 10 is mated to the caliper jig 30, thereby holding the fixed blade 16 in place, as depicted in FIG. 3.

Figure 6:
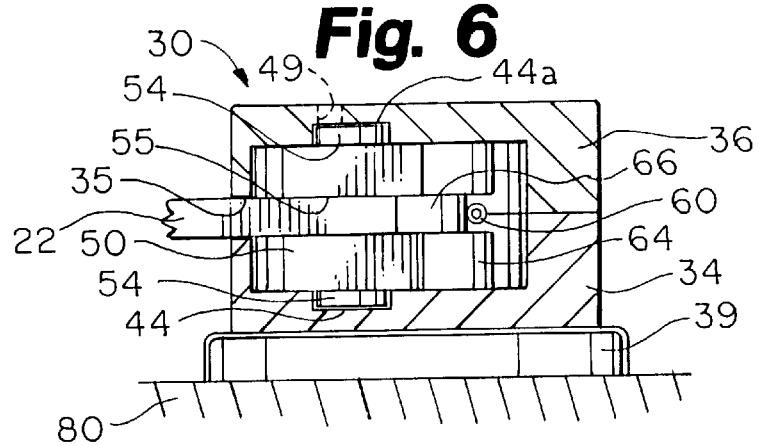
FIG. 6 is a sectional view of the caliper jig taken along line 6—6 of FIG. 1.

A guide slot 44 is defined in the body half 34 of the body 32. The guide slot 44 is an elongate, slender slot defined in the wall 47 of the body half 34. A substantially similar guide slot 44a is defined in the body half 36 and is opposed to the guide slot 44. The guide slot 44a is depicted in FIG. 6. An assembly slot 49 is an aperture that carries through the body half 36 and intersects the guide slot 44a defined in the body half 36.

An inner cavity 46 is defined within the body 32. The inner cavity 46 is formed by being milled out of both the body halves 34, 36. The inner cavity 46 is partially defined by the upper surface 47a, 47b of the body halves 34,36. A spring dowel 48 is disposed between the two body halves 34, 36 proximate at the lower portion of the fixed blade slot 40. The spring dowel 48 is borne in two opposed dowel bores 51 defined in the body halves 34, 36.

A translating block 50 is disposed within the inner cavity 46 defined between the body halves 34, 36. A guide pin 52 is disposed in a bore 53 defined in the translating block 50. The ends of the guide pin 52 project from each side of the translating block 50 and is slidingly engaged within the respective guide slot 44, 44a. A rotatable bushing 54 is disposed on the projecting ends of the guide pin 52. The rotatable bushings 54 ride in the guide slot 44 and the opposed guide slot 44a defined in the body half 36.

A sliding blade slot 55 is defined within the translating block 50. A set screw 56, that is accessible through the guide slot 44 is disposed within the translating block 50 for fixing the sliding blade 22 therein. In assembly, the set screw 56 may be tightened to fixedly engage the sliding blade 22 and loosened to disengage the sliding blade 22 by inserting a hex key through the assembly slot 49 to engage the set screw 56.

Figure 7:
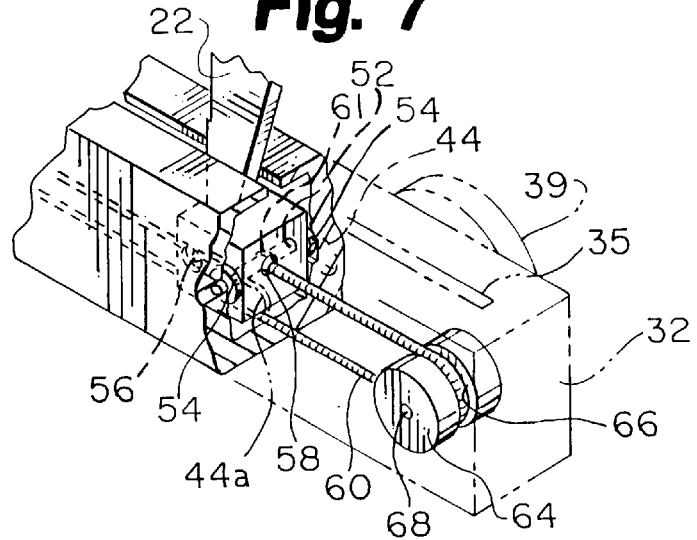
FIG. 7 is a cut-way perspective of the translatable jaw of the caliper jig.

Referring to FIG. 7, a spring retainer bore 58 is formed in the rear face 59 of the translating block 50. A first circular end 61 of the spring 60 is inserted through the spring retainer 58 and slid over the guide pin 52. A second circular end 62 of the spring 60 is slid over and fixedly coupled to the spring dowel 48, as depicted in FIG. 4. The spring 60 runs along the bottom portion of the cavity 46 and around the side of the spring post 64.

The spring post 64 is preferably formed in the shape of a spool. The spring 60 runs in the reduced diameter center portion 66 of the spring post 64. The spring post 64 is preferably formed of a low friction plastic material. The spring post 64 is rotatably supported on a pin 68 that is passed through a bore 70 defined in the spring post 64. The pin 68 is borne in a pair of opposed bores 72 defined in the respective body halves 34, 36.

Figure 5:
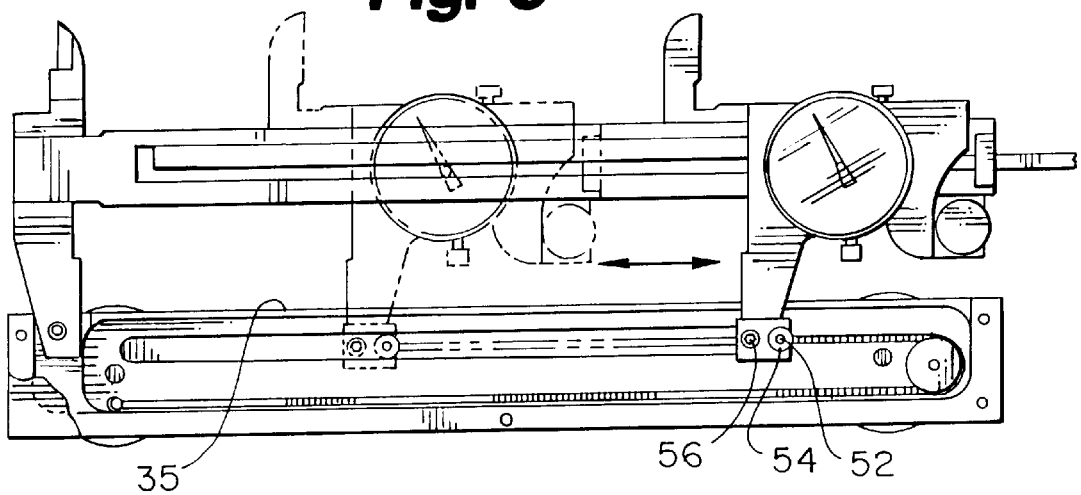
FIG. 5 is a side elevational view of the caliper jig with portions broken away and in phantom to depict the action of the caliper jig relative to translational motion of the caliper disposed thereon.

Operation of the caliper jig 30 is best understood with respect to FIGS. 1, 2, and 5. A milling or turning machine has at least a first component 80 and a second component 82. The two components 80, 82 are translatable with respect to each other during a milling or turning operation. Measurement of the relative translation is an indication of a desired parameter of the milling or turning operation. To effect a measurement of the operation, the caliper 10 is first affixed to the caliper jig 30. This accomplished by inserting the fixed blade 16 of the caliper 10 into the fixed blade slot 40 of the caliper jig 30 and affixing the fixed blade therein by compressive engagement of the set screw 42 with the side of the fixed blade 16. Simultaneously, the sliding blade 22 of the caliper 10 is positioned in the sliding blade slot 55 of the translating block 50 and affixed therein by compressive engagement of the set screw 56 with the side of the sliding blade 22. In this disposition, the sliding blade 22 is free to translate in the slot 35.

In operation, the caliper jig 30 is positioned proximate a milling or turning machine and preferably held in place on the component 80 by the magnets 39. The distal end 26 of the tail piece 24 of the caliper 10 is brought into engagement with the component 82 of the milling or turning machine. The relative translation of the milling or turning machine components 80, 82 in a first direction causes the tail piece 24 to translate within the groove 14. Such translation causes translation of the slide 18, thereby bringing the sliding blade 22 into a position closer to the fixed blade 16. Such translation carries with it the translating block 50, the bushings 56 riding in the guide slots 44, 44a, respectively. The translation of the translating block 50 acts to stretch the spring 60 and increases the tension in the spring 60.

As the milling or turning machine component 82 upon which the distal end 26 of a tail piece 24 bears retreats form the milling or turning machine component 80, the spring 60 biases the distal end 26 into continued engagement with the retreating milling or turning machine component 82. Such bias causes the distance between the sliding blade 22 and the fixed blade 16 to increase. In this manner, appropriate measurements between the fixed blade 16 and the sliding blade 22 are made that correspond to the relative motion of the portion of the milling or turning machine component 82 upon which the distal end 26 of the tail piece 24 bears with respect to the milling or turning machine component 80. With respect to FIG. 2, the caliper 10 is capable of measuring the depth of the bore 86 being made in the work piece 88.

The present invention may be embodied in other specific forms without departing from the spirit of the essential attributes thereof. Therefore, the illustrated embodiment should be considered in all respects as illustrative and not restrictive, reference being made to the appended claims rather than to the foregoing description to indicate the scope of the invention.

What is claimed is:

1. A caliper jig for use with a caliper, the caliper having a fixed measuring blade and an opposed moveable measuring blade, the jig comprising:

a caliper jig body;

a first blade engaging means defined in the caliper jig body for selectively, fixedly engaging the caliper fixed measuring blade;

a second blade engaging means disposed within a cavity defined in the caliper jig body for selectively, fixedly engaging the caliper moveable measuring blade, the second blade engaging means being translatable with respect to the first blade engaging means; and, biasing means for biasing the second blade engaging means to a disposition displaced from the first blade engaging means.

2. The caliper jig of claim 1 further including at least on magnet operably coupled to the caliper jig body for engagement with a magnetic surface, the magnetic surface supporting the caliper jig in a selected disposition.

3. The caliper jig of claim 1 further including an elongate slot defined in the caliper jig body, the slot accommodating the caliper moveable measuring blade during translation of said blade.

4. The caliper jig of claim 1 further including an assembly slot defined in the caliper jig body, the assembly slot affording access to a locking means for fixedly engaging the caliper moveable measuring blade to the second blade engaging means.

5. The caliper jig of claim 1 wherein the second blade engaging means comprises a translating block, the translating block having a blade slot defined therein for receiving the caliper moveable measuring blade.

6. The caliper jig of claim 1 wherein the biasing means is a spring having a first end coupled to the caliper jig body and a second coupled to the translating block.

7. The caliper jig of claim 6 wherein the spring defines a path passing over an idler spool and substantially reversing the path direction.

8. A caliper jig for use with a caliper, the caliper having a fixed measuring blade and an opposed moveable measuring blade, the jig comprising:

a caliper jig body having a first blade engaging means, a second blade engaging means, and biasing means, the first blade engaging means for selectively, fixedly engaging the caliper fixed measuring blade, the second blade engaging means for selectively, fixedly engaging the caliper moveable measuring blade, the second blade engaging means being translatable with respect to the first blade engaging means, and the biasing means for biasing the second blade engaging means to a disposition displaced from the first blade engaging means.

9. The caliper jig of claim 8 further including at least on magnet operably coupled to the caliper jig body for engagement with a magnetic surface, the magnetic surface supporting the caliper jig in a selected disposition.

10. The caliper jig of claim 8 further including an elongate slot defined in the caliper jig body, the slot accommodating the caliper moveable measuring blade during translation of said blade.

11. The caliper jig of claim 8 further including an assembly slot defined in the caliper jig body, the assembly slot affording access to a locking means for fixedly engaging the caliper moveable measuring blade to the second blade engaging means.

12. The caliper jig of claim 8 wherein the second blade engaging means comprises a translating block, the translating block having a blade slot defined therein for receiving the caliper moveable measuring blade.

13. The caliper jig of claim 8 wherein the biasing means is a spring having a first end coupled to the caliper jig body and a second coupled to the translating block.

14. The caliper jig of claim 13 wherein the spring defines a path passing over an idler spool and substantially reversing the path direction.

* * * * *